(12) United States Patent
Twerdochlib

(10) Patent No.: US 7,866,213 B2
(45) Date of Patent: Jan. 11, 2011

(54) METHOD OF ANALYZING NON-SYNCHRONOUS VIBRATIONS USING A DISPERSED ARRAY MULTI-PROBE MACHINE

(75) Inventor: Michael Twerdochlib, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 385 days.

(21) Appl. No.: 12/141,263

(22) Filed: Jun. 18, 2008

(65) Prior Publication Data
US 2009/0314092 A1    Dec. 24, 2009

(51) Int. Cl.
*G01H 1/00*  (2006.01)
*G01B 7/14*  (2006.01)

(52) U.S. Cl. ............... 73/659; 73/660; 73/489; 702/56

(58) Field of Classification Search ........... 73/659, 73/660, 661, 489, 112.01, 509, 579, 865.9; 702/56, 57, 113, 121, 147, 189
See application file for complete search history.

(56) References Cited

U.S. PATENT DOCUMENTS

| 4,573,358 | A | | 3/1986 | Luongo |
| 4,593,566 | A | | 6/1986 | Ellis |
| 4,790,189 | A | | 12/1988 | Twerdochlib |
| 4,887,468 | A | | 12/1989 | McKendree et al. |
| 4,896,537 | A | | 1/1990 | Osborne |
| 4,996,880 | A | * | 3/1991 | Leon et al. .................. 73/660 |
| 5,148,711 | A | | 9/1992 | Twerdochlib et al. |
| 5,152,172 | A | * | 10/1992 | Leon et al. .................. 73/579 |
| 5,206,816 | A | * | 4/1993 | Hill et al. .................... 702/56 |
| 5,942,690 | A | * | 8/1999 | Shvetsky ..................... 73/660 |
| 6,094,989 | A | | 8/2000 | Twerdochlib |
| 6,526,829 | B1 | * | 3/2003 | Lysen et al. .................. 73/593 |
| 7,027,909 | B2 | * | 4/2006 | deBotton et al. ............. 701/111 |
| 7,082,371 | B2 | * | 7/2006 | Griffin et al. ................ 702/56 |
| 7,124,637 | B2 | * | 10/2006 | Singhal et al. .............. 73/659 |
| 7,579,799 | B2 | * | 8/2009 | Robichaux et al. ..... 318/400.38 |
| 7,640,802 | B2 | * | 1/2010 | King et al. ................... 73/489 |
| 7,654,145 | B2 | * | 2/2010 | Twerdochlib ................ 73/660 |
| 7,764,038 | B2 | * | 7/2010 | Kikaganeshwala et al. .. 318/490 |

FOREIGN PATENT DOCUMENTS

WO    WO 9927359    *    6/1999

* cited by examiner

*Primary Examiner*—J M Saint Surin

(57) ABSTRACT

A method for identifying an unfolded non-synchronous blade vibration frequency in blades on a rotating rotor using a plurality of probes spaced from each other about the rotor. A set of data is acquired from the probes during a predetermined number of rotor revolutions and is processed using a Fourier analysis to generate an output representative of frequencies and phase shift angles corresponding to blade vibrations. The phase shift angles are used to identify a subharmonic for a blade vibration frequency to provide an output identifying the vibration frequency. A space dispersion and time dispersion of probes is described to increase the accuracy of the subharmonic determination using the phase shift angles.

18 Claims, 5 Drawing Sheets

| POSITION | 1 | 2 | 3 | 4 | 5 | 6 | 7 | 8 |
|---|---|---|---|---|---|---|---|---|
| PROBE | S0 | S1 | S2 | S3 | S4 | S5 | S6 | S7 |
| ANGLE | 0 | $\theta_1$ | $\theta_2$ | $\theta_3$ | $\theta_4$ | $\theta_5$ | $\theta_6$ | $\theta_7$ |

| POSITION | 1 | 2 | 3 | 4 | 5 | 6 | 7 | 8 |
|---|---|---|---|---|---|---|---|---|
| PROBE | S1 | S2 | S3 | S4 | S5 | S6 | S7 | S0 |
| ANGLE | 0 | $\theta_2 - \theta_1$ | $\theta_3 - \theta_1$ | $\theta_4 - \theta_1$ | $\theta_5 - \theta_1$ | $\theta_6 - \theta_1$ | $\theta_7 - \theta_1$ | $360 - \theta_1$ |

METHOD OF ANALYZING NON-SYNCHRONOUS VIBRATIONS USING A DISPERSED ARRAY MULTI-PROBE MACHINE

FIELD OF THE INVENTION

The present invention relates to monitoring the vibrational characteristics of a rotating blade row and, more particularly, to a method of analyzing non-synchronous vibrations detected by a multi-probe machine.

BACKGROUND OF THE INVENTION

A high speed turbo machine, such as, for example, a steam or gas turbine, generally comprises a plurality of blades arranged in axially oriented rows, the rows of blades being rotated in response to the force of a high pressure fluid flowing axially through the machine. Due to their complex design, natural resonant mechanical frequencies of the blades may coincide with or be excited by certain blade rotational speeds and rotational harmonics thereof. To prevent excessive vibration of the blade about its normal position, prudent design practice dictates that the blades be constructed such that the frequencies of the lowest modes fall between harmonics of the operating frequency of the turbine. In addition, the blades may be excited by non-synchronous forces such as aerodynamic buffeting or flutter. In order to avoid the vibration exceeding certain levels and setting up objectionable stresses in the blades, it is common to monitor the vibrations of the blades, both during the design and testing of the turbine and during normal operation of the turbine. For example, it is known to use non-contacting proximity sensors or probes to detect blade vibrations. The probes detect the actual time-of-arrival of each blade as it passes each probe and provide corresponding signals to a blade vibration monitor system (BVM). The BVM processes the signals from the probes to determine vibration levels of the blades, including vibration amplitude, frequency and phase shift. See, for example, the vibration monitoring machines described in U.S. Pat. Nos. 4,593,566, 4,887,468, 4,896,537 and 5,148,711, which patents are incorporated herein by reference.

While the BVM and similar systems applying Fourier analysis provide useful information for analyzing blade vibrations, the blade vibration wave is typically under-sampled, where inadequate data is available to provide resolution of the blade vibration frequencies. This limitation is presently overcome by adding additional, equally spaced probes and associated signal channels to the BVM. However, installing additional probes is expensive and may be physically difficult to implement in that it is generally not possible to install all of the additional spaced probes at equal spacing, nor is it generally possible to position all the probes in the same plane, such that each probe may sample a different location on the blade tip which may result in an error and spectral noise in the measurement.

The expense and difficulties in positioning plural probes may be avoided by using one probe and implementing computer modeling of the blade to unfold the one-probe Fourier spectra and identify the vibration mode. That is, the unfolding process produces numerous possible blade frequencies, and computer modeling may be implemented to select the best fit unfolded frequency. However, the one-probe configuration provides an under-sampled approach, and computer models of the blades do not accurately predict the influence of temperature, centrifugal force loading and untwist on blade mode resonance frequencies.

In an alternative approach, a sine function curve fit (SFCF) based approach may be used to analyze the blade vibrations. In this approach, five to eight probes may be positioned so as to optimize one particular blade mode, or to best optimize a group of modes. The SFCF approach involves intensive calculations and is typically limited to the case where only a single mode is excited at any one time, in that the analysis is indeterminate if two or more modes are excited.

SUMMARY OF THE INVENTION

In accordance with one aspect of the invention, a method is provided for identifying an unfolded non-synchronous blade vibration frequency in blades on a rotating rotor using a plurality of sensors spaced from each other about the rotor. The method comprises the steps of acquiring a set of data from the sensors comprising measurements of blade passing events obtained during a predetermined number of rotor revolutions; processing the set of data using a Fourier analysis to generate an output representative of frequencies and phase shift angles corresponding to blade vibrations; identifying a subharmonic frequency width based on a rotational speed of the rotor and the predetermined number of revolutions; generating a phase shift slope from the Fourier analysis output defined by a change in blade vibration wave phase shift with respect to a displacement between an initial blade passing event sensed by one of the sensors and one or more subsequent blade passing events sensed by one or more of the sensors for passage of the same blade; identifying a fold down subharmonic for a blade vibration mode using the phase shift slope; and generating an output comprising the non-synchronous blade vibration frequency using the subharmonic frequency width and the fold down subharmonic.

In accordance with another aspect of the invention, a method is provided for identifying an unfolded non-synchronous blade vibration frequency in blades on a rotating rotor using a plurality of sensors comprising at least a first sensor and a second sensor spaced from each other about the rotor. The method comprises the steps of acquiring a set of data from the sensors comprising measurements of blade passing events for each blade obtained during a predetermined number of rotor revolutions; processing the set of data using a Fourier analysis to generate a vibration wave phase shift associated with each blade passing event at each sensor; acquiring sensor locations comprising a measurement of an angular location of each sensor about the rotor; generating a phase shift slope for each blade comprising an angular change in the vibration wave phase shift over an angular change in the sensor location; generating a zero wave slope based on a shaft rotation frequency and comprising an angular change in a fundamental wave phase shift over an angular change in the sensor location; generating a target frequency for each blade based on the phase shift slope, the zero wave slope and the shaft rotation frequency; and generating an output comprising the non-synchronous blade vibration frequency using the target frequency.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
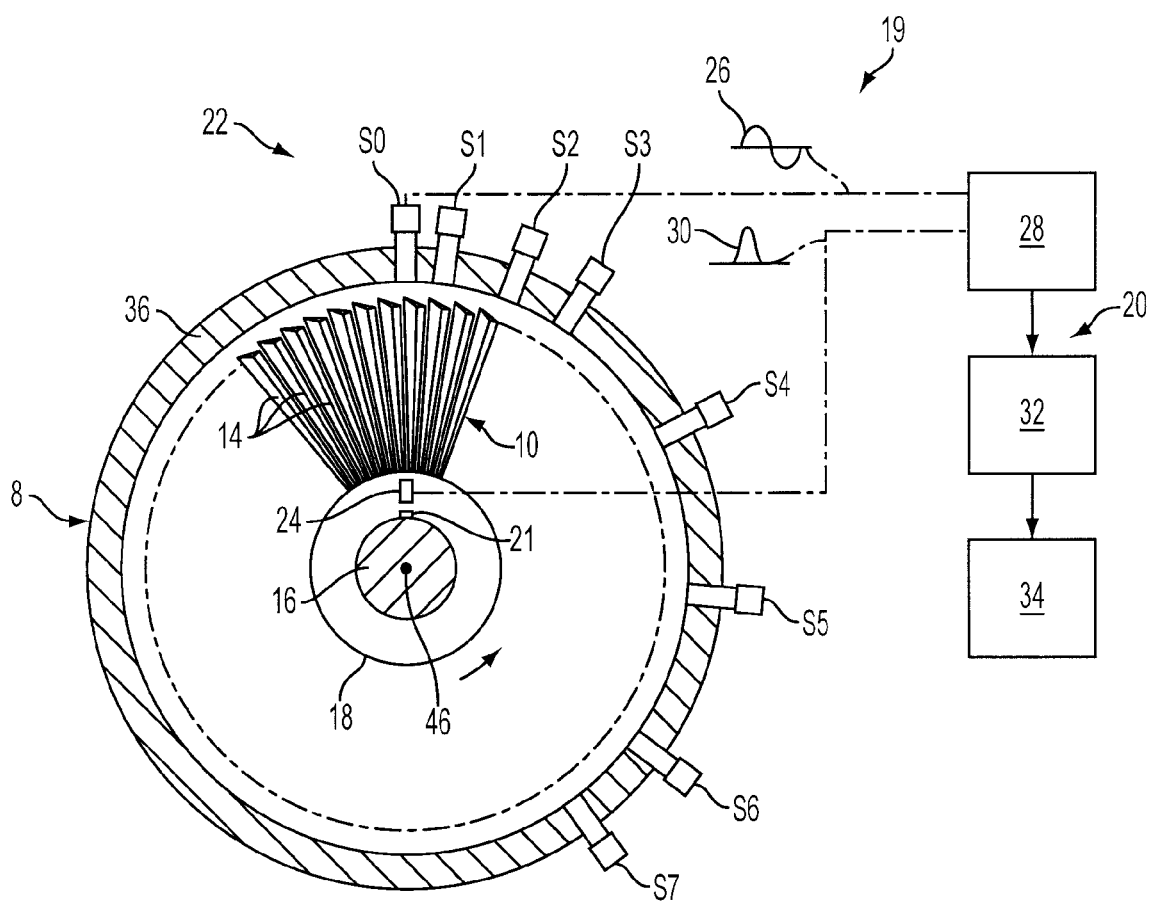
FIG. 1 is a diagrammatic view illustrating a turbo-machine and a blade vibration monitor system for performing the present invention.

FIG. 1 diagrammatically illustrates a turbo-machine 8, such as a turbine, including a shrouded turbine blade row 10 in which the method of the present invention can be employed in a blade vibration monitoring system to monitor non-synchronous turbine blade vibrations. Turbine blades 14 are connected to a rotor 16 by means of a rotor disk 18. Although the illustrated embodiment references non-shrouded blades 14, it should be understood that the present invention is equally applicable to analyze shrouded blades.

Also shown in FIG. 1 is a dispersed array machine (DAM) 19 including a signal process system 20, such as a non-synchronous turbine blade vibration monitoring system (BVM). The DAM 19 includes a set of turbine blade probe sensors 22. In the illustrated embodiment, the set of probe sensors 22 comprises individual probe sensor structures or probes S0-S7 in circumferentially spaced relation to each other for monitoring the vibration of the turbine blades 14. It should be understood that although eight probes S0-S7 are illustrated herein with reference to the present invention, the set of probe sensors 22 may comprise any number of plural probes, i.e., two or more probes, provided in circumferentially spaced relation to each other. In addition, it should be noted that probes S0-S7 are positioned at unequally spaced locations around the turbo-machine 8, and are preferably located at out of phase locations relative to each other with respect to the rotation of the rotor 16.

As is further illustrated in FIG. 1, a reference sensor 24 is additionally provided. The reference sensor 24, in conjunction with an indicia 21 on the rotor 16, is operable to provide a once-per-revolution (OPR) reference pulse signal 30. The production of such a reference signal is commonly known in the turbine art. Input signals 26 from the probe sensors 22 (probes S0-S7) are provided as inputs to a blade vibration processor 28 of the processing system 20. The signal 30 from reference sensor 24 may additionally be provided as an input to the blade vibration processor 28. The blade vibration processor 28 removes very high and low frequencies from the probe sensor input signals 26, generates a trigger at a selected point on each blade pass signal 26, and provides an adjustable arming level which each signal 26 must reach before another triggering event can occur. Both the trigger and the arming level are slope sensitive so as to prevent double triggering and unwanted triggering. In addition, a high frequency clock (100 MHz) is read at each trigger event, where the clock reading represents the time of arrival of a blade 14 at each probe position.

The output of the blade vibration processor 28 is input to a signal analyzer 32 of the processing system 20 which may perform signal analysis. Specifically, the clock readings received from the processor 28 are all digital, where each clock reading also includes a tag number (0, 1, 2, 3, 4, 5, 6, 7) that provides an indication of the particular probe (S0-S7) from which the data associated with the clock reading came. The signal analyzer 32 uses the data to generate a vibration wave for each blade 14 at each probe (S0-S7), and further performs a Fourier analysis of the data associated with the signals 26 from the probes S0-S7, as is known in the art. The signal analyzer 32 may further provide an output, such as via a display 34 or other output device, comprising information indicative of the non-synchronous blade vibrations including non-synchronous blade vibration frequencies for each of the blades 14 in the blade row 10. This output information may be implemented in a design process for configuring the blades 14, or in making determinations related to the stress and associated durability of the blades 14 when subjected to particular operating conditions.

The dispersed array machine (DAM) 19 may be implemented for accurate and simultaneous real-time measurement of multiple turbine blade flutter. In particular, the DAM 19 disclosed herein enables accurate identification of the mode or subharmonic response for a sensed non-synchronous blade vibration and further enables an accurate determination of the actual (unfolded) vibration frequency for the blade vibration. In accordance with an embodiment of the invention, the first two probes, or "first probe pair," of the probe sensors 22 are spaced a distance less than the wavelength of the highest frequency blade vibration that is to be measured. That is, based on a determination of a maximum blade vibration frequency to be identified in the blades 14, the spacing of the probes S0 and S1 is selected such that the reciprocal of the passage time for one of the blades 14 to pass between the probes S0 and S1 exceeds the maximum blade vibration frequency. It should be noted that this condition need be applied only to the "first probe pair." Additional ones of the probes S2-S7 may be located around the turbo-machine 8 (space dispersion) to provide significant increased accuracy in determining the frequency, amplitude and phase of the blade vibration. In addition to the probe dispersion based on the spacing between the probes S0-S7, the DAM 19 disclosed for the present invention may also implement a time dispersion using an array of two or more of the probes S0-S7, as is described in detail below.

Referring to the embodiment illustrated in FIG. 1, including all eight probes S0-S7 positioned around a single row 10 of the blades 14, an initial operation or step performed by the dispersed array machine comprises calculating probe angles (PA) for each of the probes S0-S7 with reference to the once-per-revolution occurrence of a signal, i.e., the OPR signal 30 received from the sensor 24. In a subsequent operation or step performed by the dispersed array machine, the calculated probe angles (PA) are used by the DAM 19 to synchronize all eight probes S0-S7. Although all probes S0-S7 make substantially identical measurements of the blade row 10, the eight independent measurements by the probes S0-S7 differ in phase. The DAM 19 synchronizes the probes S0-S7 with reference to the probe angles (PA) such that the blades 14 are tracked in the same order at each probe S0-S7, to define dynamic probe angles (DPA). The dynamic probe angles are measured every revolution of the rotor 16. Thus, the same physical blade 14 in the blade row 10 will be identified as the first blade 14 (blade-0) in the blade row 10 to be seen by each of the probes S0-S7 in a given revolution of the rotor 16.

The dynamic probe angles (DPA) comprise calculated angles of the probes S0-S7 defined relative to the first probe S0, where the first probe S0 has a referenced position of 0 degrees These dynamic probe angles (DPA) are calculated each revolution of the rotor 16. Hence, for example, the blade vibration measurements made at each of the probes S0-S7 for the first blade 14 (i.e., blade-0) in the blade row 10 will be nearly identical, except they will differ in phase (phase shift). Each subsequent blade 14 in the blade row 10 will similarly have a vibration measurement that is shifted in phase at each probe S0-S7. This difference in phase for each of the blades 14 is described in terms of a phase shift experienced by each blade 14 as it passes each probe S0-S7, wherein all phase shifts are measured with respect to the first probe S0. Thus, the blade vibration phase shift at the first probe S0 will be zero for each of the blades 14.

It should be noted that in the present analysis, the accuracy of the results of the analysis is dependent on determining the probe angles to an accuracy of hundredths of a degree. This may be contrasted to typical prior art BVMs and BVM analysis, which generally require probe angle determinations to be made to no more than about 2 to 3 degree accuracy.

The phase shift for a blade 14 at a subsequent probe S1-S7 comprises the fraction of that blade's vibration cycle completed during the blade's passage from the first probe S0 to the particular subsequent probe S1-S7, and expressed as that same fraction of 360 degrees. As previously noted, using a "first probe phase reference" sets that all first probe phases for each of the blades 14 to 0 degrees.

In a third operation or step performed by the dispersed array machine, the DAM 19 calculates the amplitude, frequency and the phase shift of every blade 14 at each probe S0-S7 using a Fourier transform. The Fourier transform analysis is typically performed using 32 revolutions of data, defining a data set, that is processed using the Fourier transform to produce a 16 point Fourier spectra including amplitude, frequency and phase. Each spectral line comprises a Fourier bin, or subharmonic, with amplitude, frequency and phase shift. Hence, the frequency width of each Fourier bin or subharmonic is defined by [(shaft rotation speed)/(number of revolutions)]. For example, assuming a blade vibration occurs at 2000 RPM (33.33 RPS), the subharmonic frequency width is [(33.33 rev/sec) /(32 revolutions)]=1.042 Hz.

As indicated above, in the present implementation of the DAM 19 to obtain measurements, the angular displacement between the first probe pair S0/S1 is selected to sense the highest blade vibration frequency to be measured. It should be noted that this condition need not be met by the other probe pairs, such as probe pairs S0/S2, S0/S3, S0/S4 ... S0/S7. The specified probe pair spacing of the first probe pair S0/S1 is employed to identify and correct for rollover (i.e., vibration phase shifts greater than 360 degrees) that may occur in other probe pairs. It should further be noted that this condition is applicable in both the "space dispersion" and the "time dispersion" dispersed probe array approaches described below.

When a Fourier analysis is applied to each probe (S0-S7) independently, the vibration signal from a given one of the blades 14 must sampled or sensed at least two times within the wavelength of the blade vibration in order to resolve the vibration frequency. If the blade vibration is sampled less often each vibration cycle, the true vibration frequency is folded down onto the Fourier spectra, as a result of subharmonics exceeding the highest subharmonic defining the Fourier spectra. As the frequency of the blade vibration increases, more and more folds must take place to bring the true vibration excitation subharmonic into the Fourier spectra, and it becomes increasingly difficult to identify the true excitation subharmonic using a computer generated model of the blade's vibration, such as has been implemented in prior systems. In many cases, different blade vibration modes (subharmonics) may fold onto the Fourier spectra at the same point, making it impossible to distinguish one mode from another without additional information to analyze the blade vibration. As is described in detail below, the DAM 19 removes all such fold over, thus enabling a true and unambiguous measurement of each and every blade vibration mode amplitude, frequency, and phase, with frequency resolution far better than that provided by Fourier analysis.

In order to determine an accurate unfolded blade vibration frequency, the blade vibration phase shift calculated by the DAM 19 for each of the probes S0-S7 may be used, where the blade vibration frequency is calculated with reference to a change of the blade vibration phase shift with respect to a displacement between the probes S0-S7. The displacement may be a physical angular spacing between two or more of the probes S0-S7, or a dynamic displacement defined in terms of an angular displacement between measurements made by two or more probes S0-S7.

Figure 2:
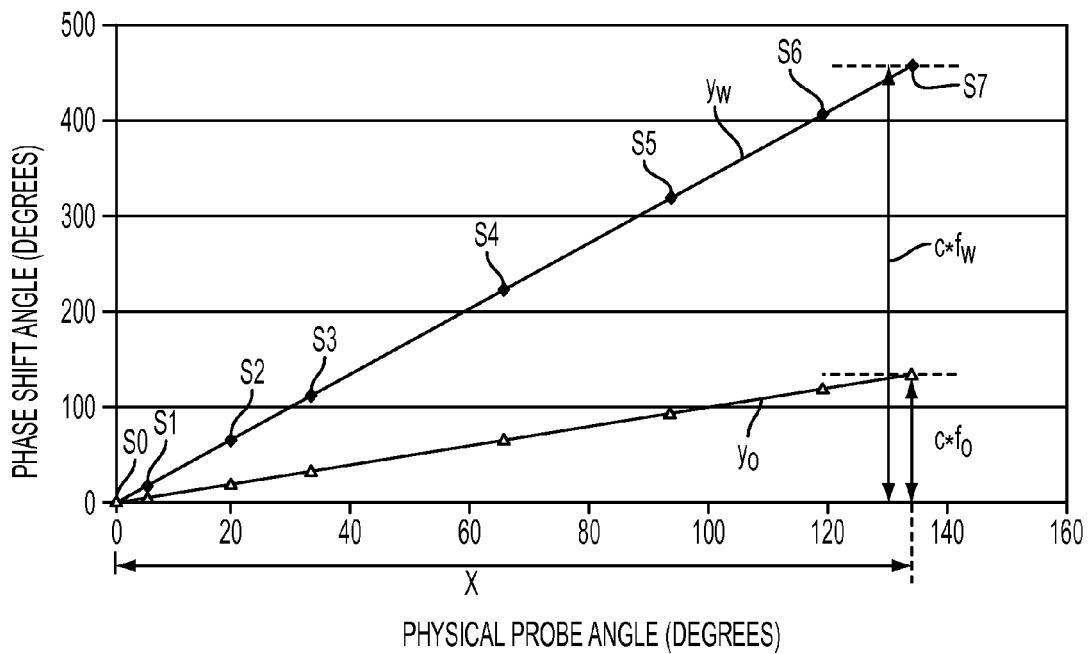
FIG. 2 is a plot illustrating probe angle vs. phase shift angle for a blade vibration wave and for a fundamental wave.

Referring to FIG. 2, an operation for identifying an unfolded non-synchronous blade vibration frequency in the blades 14 is described with reference to one particular blade 14 sensed by the eight probes S0-S7, and based on a change in blade vibration wave phase shift with respect to a physical angular displacement of the probes S1-S7, referenced from the first probe S0. As illustrated by the line $y_w$, comprising a best fit line to the phase shift data derived from each probe S0-S7, the change in the vibration wave phase shift with respect to the change in the angular displacement of the probes S1-S7 is substantially linear and may be expressed as a vibration phase shift slope $b_w$.

It should be noted here that for higher numbered probes, i.e., any of the probes S2-S7, one or more full vibration cycles may have occurred between probe S0 and that probe. The DAM 19 will clearly recognize this occurrence as a step deviation (drop) in the projected line $y_w$. As the points S0, S1, S2, ... S7 on the line $y_w$ are progressively calculated by the DAM 19, and such a step deviation is encountered, 360 degrees is added to this calculated vibration phase so as to return this point to a position on projected line $y_w$. In extreme cases, i.e., high blade vibration frequency and far separated probes, higher orders of 360 degrees (i.e., 720, 1080, ... ) are added to the calculated vibration phase. It should be understood that it is this quantum nature of this process that provides an intrinsic accuracy to the result provided by the DAM 19 described herein.

A theoretical "zero wave" line, $y_0$, is also illustrated in FIG. 2. The "zero wave" line results from a zero vibration wave having a frequency equal to the rotor rotation frequency and is a fundamental wave in that for each probe S0-S7, the measured zero vibration wave completes one full vibration cycle for each revolution of the rotor 16. The change in the zero wave phase shift angle with respect to the change in the angular location of the probes S1-S7 relative to the first probe S0, is described by a slope, $b_0$, of the zero wave line $y_0$. It should be noted that for both of the lines $y_w$ and $y_0$, the data point located at phase angle 0 and probe angle 0 corresponds to the measurement at the first probe S0, and subsequent data points on each line $y_w$, $y_0$ correspond to measurements made at each of the successive probes S1-S7. The zero wave line $y_0$ provides an accurate reference for the DAM 19 to use in calibrating the unfolded vibration frequency, based on the very accurate measurement of the rotational frequency of the rotor 16.

It should be noted that, since the zero vibration wave, i.e., the fundamental wave, and the rotor 16 have the same frequency, $f_0$, the zero wave line $y_0$ has a slope $b_0=1$. In addition, the vibration wave phase shift is proportional to a blade vibration "target" frequency $f_w$, as may be represented by a proportionality constant c. Hence, the relationship between blade wave vibration phase shift and the blade vibration target frequency $f_w$ may be expressed as:

$$(\text{Blade vibration phase shift}) = c * f_w \qquad (1)$$

As may be seen in FIG. 2, two triangles may be defined corresponding to the two lines $y_w$ and $y_0$, each triangle having a respective vertical dimension $c*f_w$ and $c*f_0$, and each having a common horizontal dimension of x. The two following equations may be derived from these triangles to define the corresponding slopes:

$$b_0 = \frac{c * f_0}{x}, \qquad (2)$$

and $$b_w = \frac{c * f_w}{x}, \qquad (3)$$

Solving equations (2) and (3) for the common variable x and setting the resulting equations equal to each other provides:

$$\frac{c * f_0}{b_0} = \frac{c * f_w}{b_w}. \qquad (4)$$

Solving for $f_w$ defines the target frequency $f_w$ as:

$$f_w = \left(\frac{b_w}{b_0}\right) * f_0. \qquad (5)$$

Accordingly, since the zero wave slope $b_0$ is known to be one, and the zero wave frequency $f_0$ is known from the rotational speed of the rotor 16, it is possible to determine the target frequency $f_w$ from the calculated slope $b_w$ of the vibration wave phase shift line $y_w$.

The known target frequency $f_w$ may be used to identify a target fold down subharmonic $h_w$ by dividing the target frequency $f_w$ by the subharmonic frequency width $f_h$, and rounding off to the nearest integer. That is, the target fold down subharmonic $h_w$ may be expressed as:

$$h_w = \text{round}\left(\frac{f_w}{f_h}\right) \qquad (6)$$

It should be noted that the target frequency $f_w$ defines a target subharmonic $h_w$ which typically lies far outside of the limited Fourier spectrum, which spectrum is composed of only 16 subharmonics (i.e., subharmonics or Fourier bins 1 through 16). Further, the target subharmonic $h_w$ provided by the DAM 19 in equation (6) above is not necessarily the actual or true (unfolded) blade vibration mode subharmonic. However, since the true blade vibration mode subharmonic can only have certain possible values (possible true subharmonics) that are specific and known, and these possible values are generally far apart, the DAM 19 may determine the true fold down subharmonic by selecting the possible vibration mode subharmonic that is closest to the calculated target subharmonic $h_w$ corresponding to the target frequency $f_w$.

Figure 9:
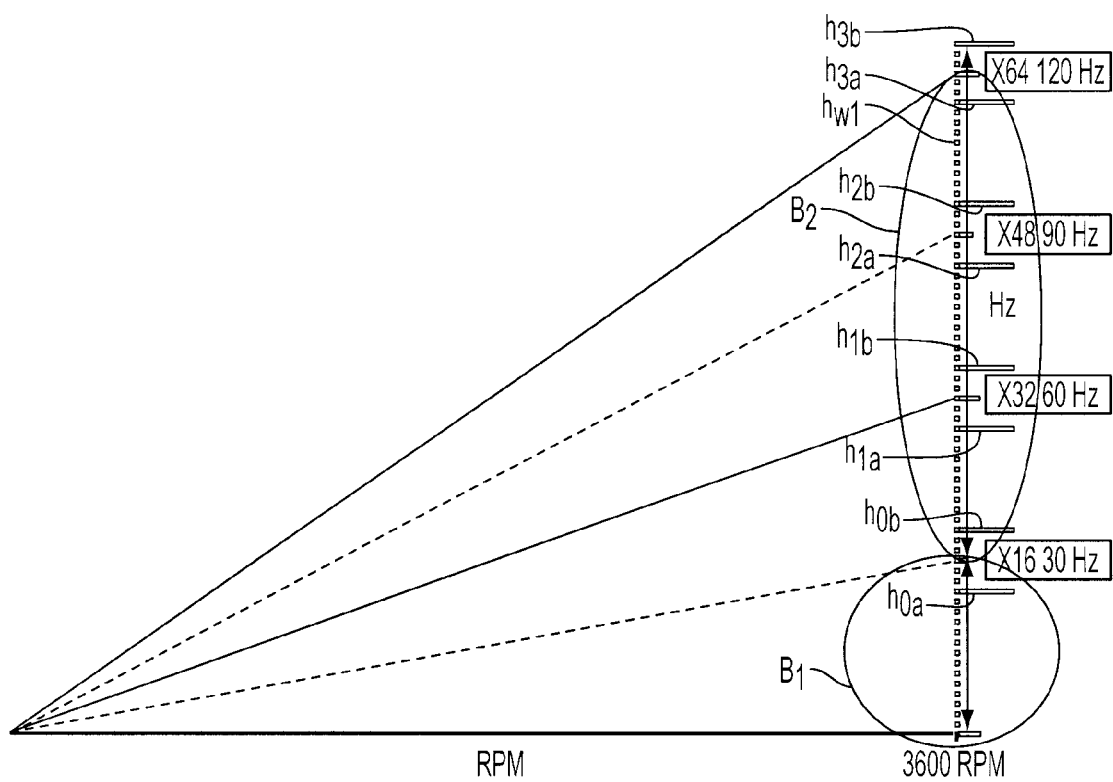
FIG. 9 is a Campbell diagram illustrating the identification of possible true subharmonics for use in selecting a fold down subharmonic.

Referring to the Campbell diagram of FIG. 9, an example illustrating the identification of possible true subharmonics is shown. In this example, the Fourier spectrum for a blade vibration at a rotor rotation speed of 3600 RPM is identified by an area $B_1$, and an area $B_2$ identifies the range outside of $B_1$ that may include fold down subharmonics, which range could conceivably be infinite. A subharmonic $h_{0a}$ is identified in the Fourier spectrum, where it is understood that this subharmonic could be produced by any subharmonic in the area $B_2$ folded about one of the multiples of the first half-harmonic of the rotational frequency (60 Hz/2=30 Hz). That is, the subharmonic $h_{0a}$ identified in the Fourier spectrum may correspond to any one of the fold down subharmonics $h_{0b}$ (at $1^{st}$ half-harmonic, 30 Hz; ×16); $h_{1a}$, $h_{1b}$ (at $2^{nd}$ half-harmonic, 60 Hz; ×32); $h_{2a}$, $h_{2b}$ (at $3^{rd}$ half-harmonic, 90 Hz; ×48); or $h_{3a}$, $h_{3b}$ (at $4^{th}$ half-harmonic, 120 Hz; ×64), or other subharmonics folded about the $5^{th}$, $6^{th}$, 7th, ... half-harmonics. The set of subharmonics $h_{0b}, h_{1a}, h_{1b}, h_{2a}, h_{2b}$ ... comprise identified possible true subharmonics. By way of example, a target subharmonic identified at $h_{w1}$ in FIG. 9, that does not fall directly on a fold down subharmonic, would be determined by the DAM 19 to correspond to the true subharmonic identified as $h_{3a}$, i.e., the closest possible true subharmonic. Hence, it should be understood that the value $h_w$ described by equation (6) may be processed by the DAM 19 to provide a true fold down subharmonic value, generally identified as $h_T$.

The accurate or true blade vibration frequency $f_T$ may be generated by multiplying the true fold down subharmonic $h_T$ by the subharmonic frequency width $f_h$, and expressed as:

$$f_T = h_T * f_h \qquad (7)$$

To illustrate an application of the described method for generating an accurate vibration frequency, assume a blade vibration is identified as occurring at 2000 RPM (33.33 RPS) and the best fit line for the vibration wave phase shift determined through Fourier analysis is 3.3968. The target frequency is calculated to be $f_w=(3.3968/1)*(33.33 \text{ Hz})=113.2$ Hz. The subharmonic is calculated to be $h_w=\text{round}(113.2/1.0417)=\text{round}(108.7)=109$. The accurate or true frequency is then determined to be $f_T=(109)*(1.0417 \text{ Hz})=113.55$ Hz. It should be noted that in this example, the target subharmonic (109) falls directly in a possible true subharmonic. For higher frequency vibrations, i.e., higher true subharmonics, the calculated target subharmonic may miss or be displaced from a possible true subharmonic by approximately 2 or 3 subharmonics, for example, in which case the DAM 19 will identify the true subharmonic as the closest possible true subharmonic to the target subharmonic.

Figure 3:
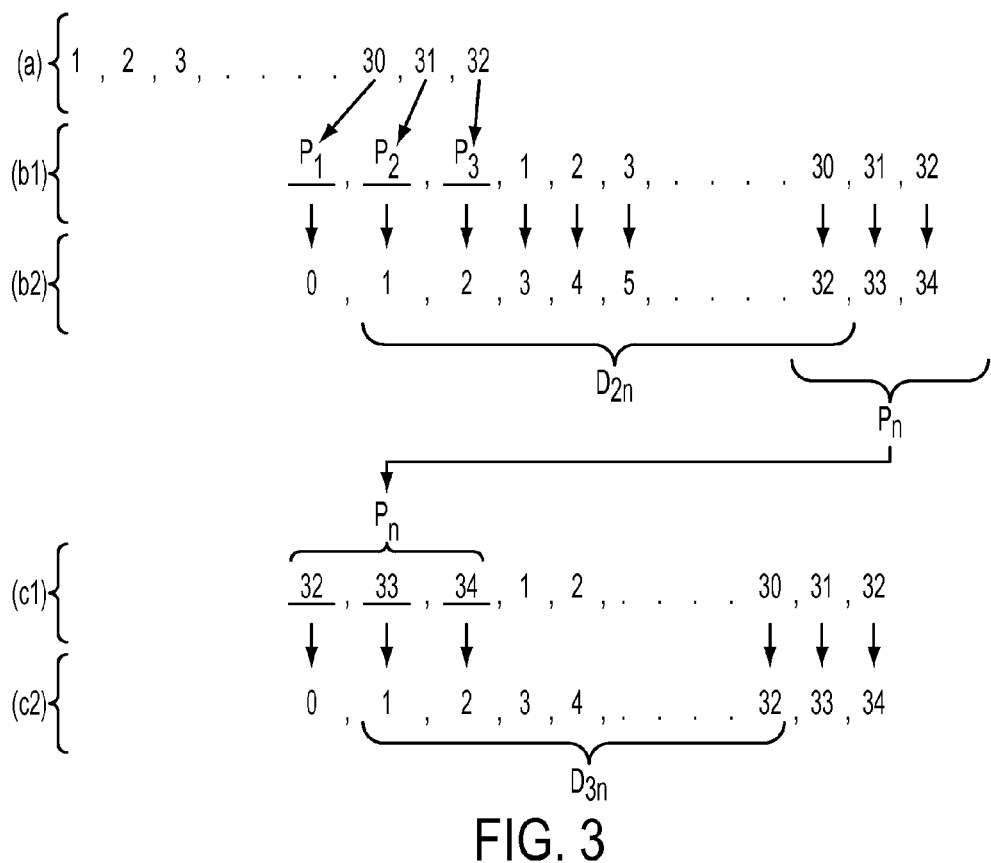
FIG. 3 is a diagram illustrating a process for carrying over data between scans to retain coherence in blade vibration wave phase shift from scan to scan.

The accuracy of the DAM 19 may be increased by increasing the precision of the phase shift analysis, which may be accomplished by analyzing additional revolutions of data included with a "current" set (scan) of data. In accordance with a known operation for processing data using a BVM, 32 revolutions data are typically collected, defining a scan, and the scan is analyzed, i.e., using a Fourier analysis operation, following completion of capture. Although the analysis information is generally provided approximately one-half second (32 revolutions at 3600 RPM) delayed from real or present time, the data of the current scan being analyzed will nevertheless be referred to as being the current time. When the DAM 19 receives a new 32 revolution scan data packet, the last three revolutions from the just completed (previous) scan is prefixed to this new, current time data packet, providing a total of 35 revolutions of data. This is illustrated in FIG. 3 where row (b1) depicts the current time data packet (1-32) and includes three positions $P_1$, $P_2$, $P_3$ for receiving the last three revolutions (30, 31, 32) of a just completed previous (e.g., initial) scan, depicted at row (a). The resulting combined set of data comprises 35 revolutions of data numbered 0, 1, 2, 3, 4, . . . 34, as is depicted at row (b2).

The data used for the Fourier analysis operation comprises revolution 1 through revolution 32 of the renumbered scan data, and identified as data $D_{2n}$ in row (b2) of FIG. 3. In addition, it may be noted that one additional scan before and two scans after the current scan data may be used by filtering algorithms employed before the Fourier analysis.

The analyzed revolutions of data $D_{2n}$ in row (b2), i.e., revolution 1 through revolution 32, are defined as "present-time". In this sense, the trailing two data revolutions of the renumbered scan data, i.e., revolution 33 and revolution 34, are future-events that are analyzed in the next scan. That is, when the last three revolutions of data, $P_n$, are moved to the next scan, depicted at row (c1), the data included in revolutions 33 and 34 from the data of row (b2) will be included as renumbered revolutions 1 and 2 in the vibration analysis performed on revolutions 1-32 of the next scan of data, identified as data $D_{3n}$ in row (c2) of FIG. 3. The DAM 19 analyzes only the central 32 "present time" revolutions for the Fourier analysis operation as described above, but determines the blade vibration wave phase shift over the entire 35 revolutions. In addition, it can be seen that in the process performed by the DAM 19, the last 2 revolutions (revolutions 33 and 34) of each renumbered set of scan data comprise "future-time" data that will be analyzed the next scan. This future-time vibration wave is used by the DAM 19 to calculate a future-time vibration phase shift, which may then be carried over to the next scan to retain coherence (continuity) in blade vibration wave phase from scan to scan. Thus the DAM 19 can operate over many scans for the purpose of increasing the precision of its phase shift analysis. Contiguous coherent multi-scan analysis is not performed for determination of vibration amplitude since this would result in excessive averaging, resulting in the loss of high peaks in the vibration measurement, and corresponding to the most damaging vibrations.

There may exist an infinite number of subharmonics extending beyond the 16 subharmonics forming the Fourier spectra, where the number of subharmonics forming the Fourier spectra is one half the number of data points analyzed each scan. A further process for increasing the resolution of the output provided by the DAM 19 comprises utilizing multiple scans to increase the number of Fourier spectra subharmonics. For example, providing data from four scans will increase the number of subharmonics or Fourier bins to 64, with a corresponding reduction in the subharmonic frequency width. The increased number of scans provide increased accuracy in determining the best linear fit slope of the vibration wave phase shift, to provide accurate determination of the associated subharmonic for calculating the vibration frequency.

It should be noted that the accuracy of the above-described process of the DAM 19 is related to the accuracy associated with the determination of the slope $b_w$ for the best fit vibration wave phase shift line $y_w$. Further, it may be seen from the embodiment illustrated in FIG. 2 that the last probe S7 is physically located less than 140 degrees from the first probe S0. However, as the maximum distance of one or more probes S2-S7 is extended from the first sensing location provided by the first probe S0, the more sensitive will be the analysis provided by the DAM 19, it being understood that the spacing between the "first probe pair" S0/S1 must still be maintained at less than one vibration cycle occurring during a blade passage between S0 and S1 so that any possible roll over (requiring an addition of n*360 degrees) can be detected by the DAM 19. In particular, a cantilever effect may be utilized wherein a given change in the phase shift angle will influence the slope $b_w$ of line $y_w$ more strongly in response to a given change in the probe angle as the distance from the first sensing location of the first probe S0 (i.e., probe angle) is increased. Accordingly, the present invention further provides a method of effectively forming a greater cantilever or distance between the first and last measurements made by the probes S0-S7, referred to herein as providing a dispersed probe array.

Figures 4A, 4B, 5:
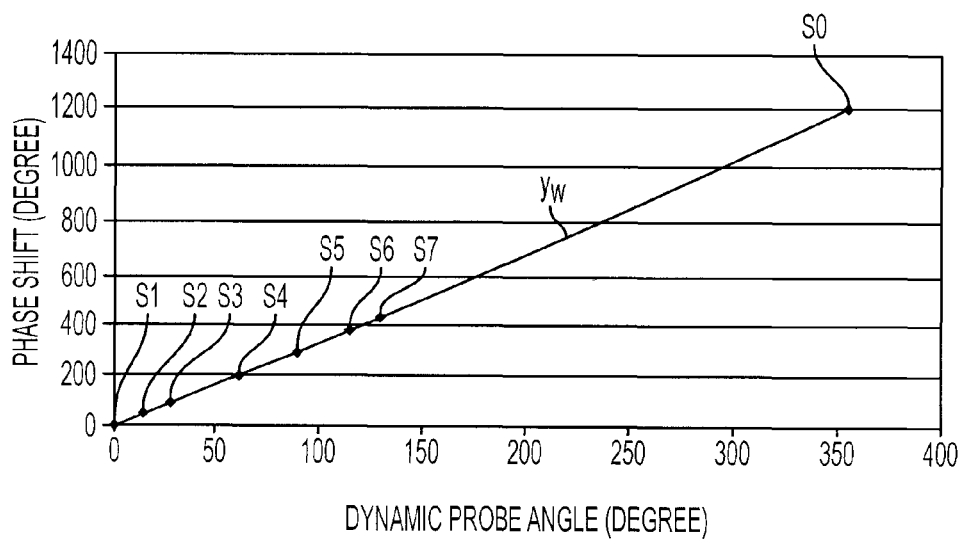
FIGS. 4A and 4B are tables illustrating reassignment of probes to provide a probe array dispersed in the space dimension.
FIG. 5 is a plot illustrating probe angle vs. phase shift angle for a blade vibration wave generated with a probe array dispersed in the space dimension.

In a first approach to providing a dispersed probe array, the array of probes S0-S7 may be dispersed in the space dimension ("space dispersion"), where a designated last probe is effectively displaced at a large probe angle relative to a designated first probe. In particular, consider the first described array of probes S0-S7 where the maximum probe angle from the first probe S0 to the last probe S7 is illustrated as being less than 140 degrees, as seen in FIG. 2. According to the space dispersion approach for the DAM 19, the first designated order for the array of probes S0-S7 may be reordered or dispersed to displace the designated last probe in the array at a greater angle from the designated first probe in the array. As is illustrated in the tables of FIGS. 4A and 4B, the designated order of the probes S0-S7 may be shifted around the circumference of the turbo-machine 8 such that the first two probes are S1 and S2 and the last probe is S0. In the tables of FIGS. 4A and 4B, the angular positions of the probes S1, S2, . . . S7 relative to the probe S0 are designated by the angular designations $\theta_1, \theta_2, \ldots \theta_7$, respectively.

It can be seen in FIG. 4B that the order of the probes S0-S7 is shifted with reference to the new designated first probe S1, and that the last angular relationship, i.e., between the designated first probe S1 and the designated last probe S0 in the direction of rotor rotation, is substantially larger than the angular relationship between the first probe S0 and the last probe S7 of the probe order described in the table of FIG. 4A. For example, from the last row of FIG. 4B, describing the angles of each of the probes relative to the first probe position, it can be seen that the final probe, S0, is located at 360 degrees minus the initial first probe pair spacing, $\theta_1$, where it may be recalled the initial spacing $\theta_1$ between the first probe pair S0/S1 is selected as small to obtain a desired upper limit for frequency resolution. Hence, the angle $360-\theta_1$ is relatively large and provides a substantial cantilever effect for influencing the accuracy of the determination of the slope $b_w$ of line $y_w$. This is illustrated in the phase shift plot of FIG. 5, in which it can be seen that the last point (probe S0) on line $y_w$ is displaced a substantially large angular distance from the designated first probe S1, and in the present example is displaced greater than 350 degrees from probe S1.

The two phase shift data sets obtained via the probe assignments described in FIGS. 4A and 4B may also be interlaced or combined, effectively increasing the probe array to a 16 probe set, and doubling the data set to refine the best fit line $y_w$ and increase the accuracy of the slope determination for use in calculating the target frequency $f_v$. The process of shifting the assignment or designation of the probes S0-S7 around the circumference of the turbo-machine 8 may be repeated as described with reference to FIGS. 4A and 4B to obtain six additional data sets, to generate a total of 64 data points from which the vibration frequency may be calculated. It should be noted that the described process for space dispersion of the probes S0-S7 is possible because, once an initial estimate of the vibration frequency is obtained using the initial close spacing of the probe pair S0/S1, the restraint of a small spacing between the first probe pair is no longer required. Further, it should be understood that although the present space dispersion approach is described with reference to an eight probe array, this approach may be implemented with any number of probes, including as few as two probes.

In a second approach to providing a dispersed probe array, one or more probes of the array of probes S0-S7 may be dispersed in the time dimension, as referenced to the rotation of the rotor 16, and is referred to herein as "time dispersion". The time dispersion approach effectively shifts one or more probes in the time dimension by an integral number of revolutions of the rotor 16. In particular, the probe array may be defined by one or more probes being used more than one time, where the location of each probe defined in the probe array is referenced to each blade passing event and effectively utilizes "future" data in that some effective probe locations may be located at a displacement greater than one revolution past the first probe in the array.

Figure 6:
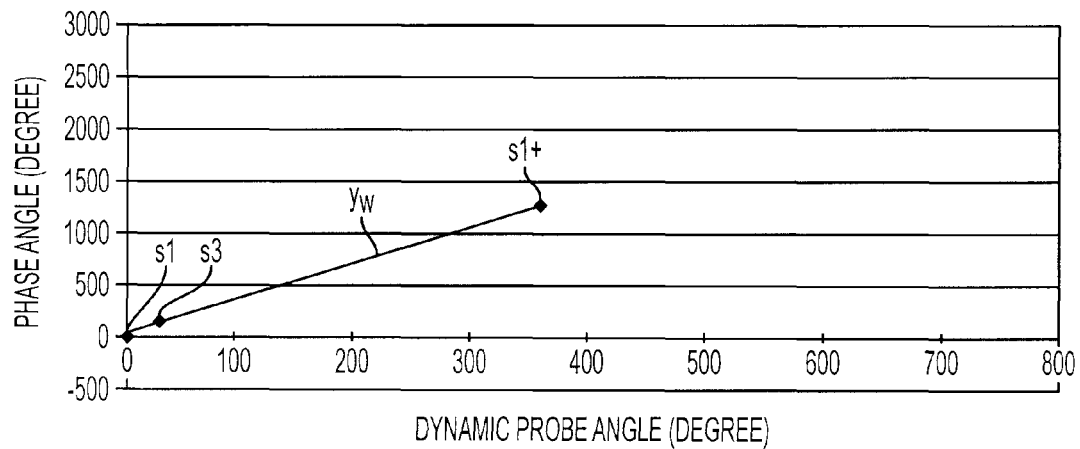
FIG. 6 is a plot illustrating probe angle vs. phase shift angle for a blade vibration wave sensed by a first example of a probe array dispersed in the time dimension.

As an example of the time dispersion approach, consider a probe array selected from probes S0-S7 and comprising only two selected probes, S1 and S3. Here, it is assumed that the probe pair S1/S3 is sufficiently close in order to be utilized to provide an initial estimate of the vibration frequency. A time dispersion probe array configuration utilizing the probes S1 and S3, and one of the probes, S1, time dispersed into the next revolution, may be described by the nomenclature, s1, s3, s1+, where s1+ indicates that probe S1 has been time dispersed into the next revolution of the rotor 16. In other words, s1, s3, s1+ comprises three blade passing events where the first two blade passing events, sensed at S1 and S3 occur in an initial revolution of the rotor 16, and the last blade passing event is sensed at the same probe S1, but in the next subsequent revolution of the rotor 16. A vibration wave phase shift plot produced by the time dispersion of blade passing events s1, s3, s1+ is illustrated in FIG. 6. The time dispersed probe angle (here s1/s1+) is always equal to or greater than 360 degrees.

Figure 7:
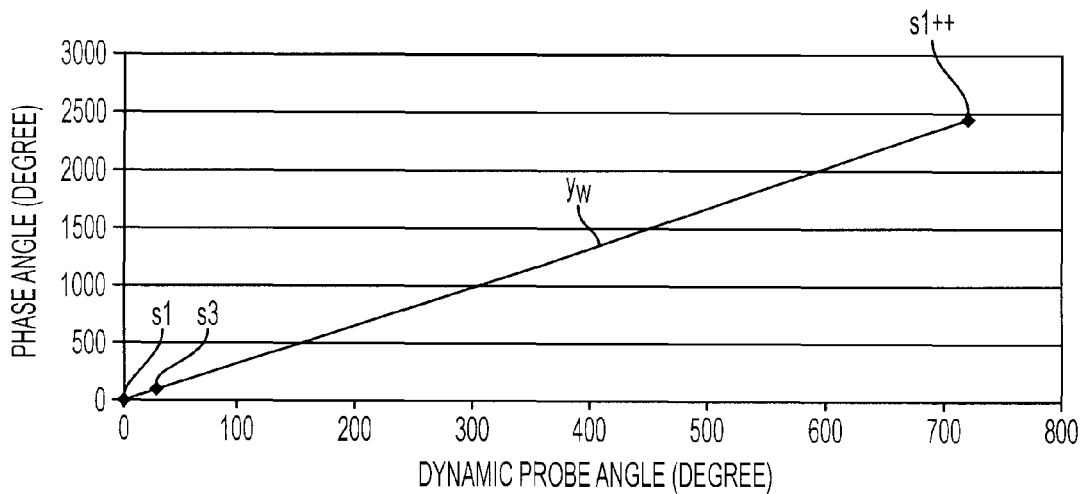
FIG. 7 is a plot illustrating probe angle vs. phase shift angle for a blade vibration wave sensed by a second example of a probe array dispersed in the time dimension.
Figure 8:
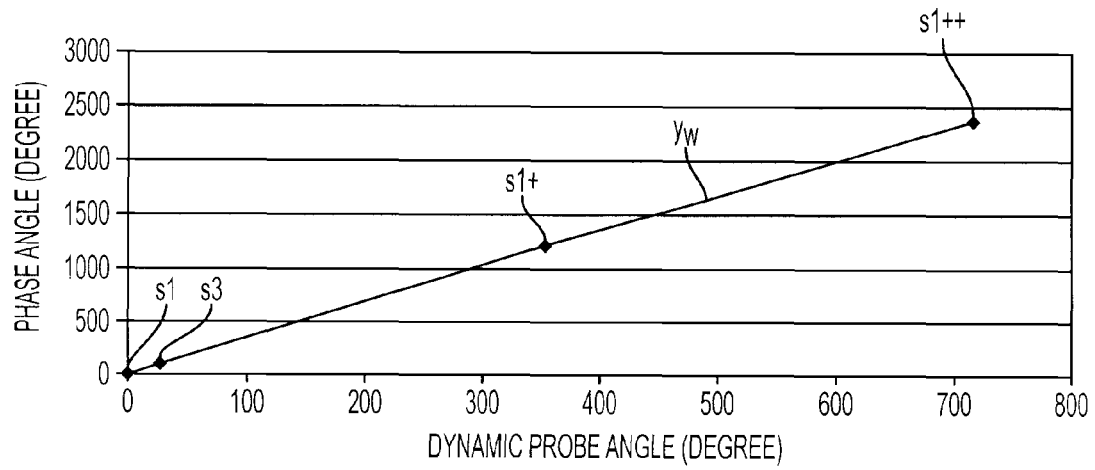
FIG. 8 is a plot illustrating probe angle vs. phase shift angle for a blade vibration wave sensed by a third example of a probe array dispersed in the time dimension.

As illustrated in FIGS. 6 and 7, various combinations of time dispersed blade passing events may be implemented to provide different combinations of the dynamic probe angles. FIG. 6 illustrates a vibration wave phase shift plot associated with effective probe angles defined by blade passing events s1, s3, s1++, where the last effective probe angle is dispersed in time by two revolutions (hence the nomenclature ++). FIG. 7 illustrates a vibration wave phase shift plot associated with effective probe locations defined by blade passing events s1, s3, s1+, s1++, where probe S1 is dispersed in time two times, i.e., dispersed by one revolution and by two revolutions. It can be seen that dispersing the probe S1 in time two revolutions increases the "cantilever" in data by a factor of three. As in the previously described approaches for implementing the invention, the order of blade arrival is tracked with respect to the dynamic probe angle to ensure that each blade passing event is identified with a particular blade 14 at each of the effective probe locations.

It should be noted that, although the implementation of the DAM 19 described above is presented with reference to identification of a single vibration excitation frequency, the scans obtained by the DAM 19 may include multiple simultaneously occurring vibration excitation frequencies. The DAM 19 can resolve any number of coexisting vibration frequencies (blade modes) that do not overlap on the Fourier spectra. In the infrequent event where two vibration modes fold onto the same 16 subharmonic Fourier spectra, the DAM analysis can be performed using two or more scans, thus providing the increased frequency resolution required to separate the apparent overlapping blade vibration modes.

The multiple vibration frequencies may be analyzed independently by the above described method to provide an accurate determination of each of the frequencies. For example, if a second vibration frequency occurs in a blade, such as may be detected in a limited number of scans, an analysis of these particular scans may be performed by the DAM 19 to identify the second vibration frequency. This ability to resolve multiple coexisting vibration frequencies is advantageous in that, at high vibration levels, a stronger responding mode can couple and excite other modes via nonlinear effects.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of identifying an unfolded non-synchronous blade vibration frequency in blades on a rotating rotor using a plurality of sensors spaced from each other about the rotor, said method comprising the steps of:
    acquiring a set of data from said sensors comprising measurements of blade passing events obtained during a predetermined number of rotor revolutions;
    processing said set of data using a Fourier analysis to generate an output representative of frequencies and phase shift angles corresponding to blade vibrations;
    identifying a subharmonic frequency width based on a rotational speed of said rotor and said predetermined number of rotor revolutions;
    generating a phase shift slope from said Fourier analysis output defined by a change in blade vibration wave phase shift with respect to a displacement between an initial blade passing event sensed by one of said sensors and one or more subsequent blade passing events sensed by one or more of said sensors for passage of the same blade;
    identifying a fold down subharmonic for a blade vibration mode using said phase shift slope; and
    generating an output comprising said non-synchronous blade vibration frequency using said subharmonic frequency width and said fold down subharmonic.

2. The method of claim 1, including the step of identifying a maximum blade vibration frequency to be identified in said blades, wherein said plurality of sensors includes a first sensor and a second sensor spaced from said first sensor a predetermined distance, and the reciprocal of a passage time for one of said blades to pass through said predetermined distance exceeds said maximum blade vibration frequency.

3. The method of claim 2, wherein said displacement between said initial blade passing event and said one or more subsequent blade passing events comprises a distance traveled by said blade that is greater than said predetermined distance between said first sensor and said second sensor.

4. The method of claim 1, wherein said initial blade passing event is sensed by said first sensor and said one or more subsequent blade passing events is sensed by one or more subsequent sensors, and further including the step of:

acquiring one or more additional sets of data from said sensors during a predetermined number of revolutions for each data set where, for each additional acquired set of data, said initial blade passing event is acquired from a location around said rotor displaced from a location for acquiring an initial blade passing event associated with a previously acquired set of data, to thereby effect an increase in the precision of the generation of the phase shift slope.

5. The method of claim 1, wherein at least one of said one or more subsequent blade passing events comprises a blade passing event displaced at least one revolution of said rotor from said initial blade passing event.

6. The method of claim 5, wherein said initial blade passing event is sensed by a first sensor and said one or more subsequent blade passing events for generating said phase shift slope comprise at least one subsequent blade passing event sensed by said first sensor.

7. The method of claim 1, wherein said step of identifying a fold down subharmonic further comprises generating a zero wave slope based on a shaft rotation frequency and defined by a change in a fundamental wave phase shift with respect to an angular displacement about said rotor, and generating a target frequency based on said phase shift slope, said zero wave slope and said shaft rotation frequency, wherein said output comprising said non-synchronous blade vibration frequency is proportional to said target frequency.

8. The method of claim 7, wherein said target frequency is determined by the relationship:

$$f_w = \left(\frac{b_w}{b_0}\right) * f_0$$

where:
  $f_w$=target frequency;
  $f_0$=shaft rotation frequency;
  $b_0$=zero wave slope; and
  $b_w$=phase shift slope.

9. The method of claim 8, wherein said step of identifying a fold down subharmonic further comprises the steps of:
  identifying a target subharmonic by dividing said target frequency by said subharmonic frequency width;
  identifying a set of possible true subharmonics; and
  selecting one of the possible true subharmonics closest to said target subharmonic as said fold down subharmonic.

10. The method of claim 9, wherein said step of identifying said target subharmonic further comprises rounding to the closest integer the result of said dividing said target frequency by said subharmonic frequency width.

11. The method of claim 9, wherein said step of generating said output comprising said non-synchronous blade vibration frequency comprises the step of:
  multiplying said fold down subharmonic by said subharmonic frequency width.

12. The method of claim 1, further including the step of:
  acquiring one or more additional sets of data from said sensors during a predetermined number of revolutions for each data set, each successive additional data set comprising a current data set;
  prefixing one or more revolutions of data from a previous data set to said current data set to form a combined data set;
  defining a present data set comprising a number of revolutions of said combined data set equal to said predetermined number of revolutions of said current data set; and
  wherein said present data set includes one or more of said revolutions of data prefixed on said current data set and is provided for use in said processing of data using said Fourier analysis.

13. A method of identifying an unfolded non-synchronous blade vibration frequency in blades on a rotating rotor using a plurality of sensors comprising at least a first sensor and a second sensor spaced from each other about the rotor, said method comprising the steps of:
  acquiring a set of data from said sensors comprising measurements of blade passing events for each blade obtained during a predetermined number of rotor revolutions;
  processing said set of data using a Fourier analysis to generate a vibration wave phase shift associated with each blade passing event at each sensor;
  acquiring sensor locations comprising a measurement of an angular location of each sensor about said rotor;
  generating a phase shift slope for each blade comprising an angular change in said vibration wave phase shift over an angular change in said sensor location;
  generating a zero wave slope based on a shaft rotation frequency and comprising an angular change in a fundamental wave phase shift over an angular change in said sensor location;
  generating a target frequency for each blade based on said phase shift slope, said zero wave slope and said shaft rotation frequency; and
  generating an output comprising said non-synchronous blade vibration frequency using said target frequency.

14. The method of claim 13, wherein said target frequency is determined by the relationship:

$$f_w = \left(\frac{b_w}{b_0}\right) * f_0$$

where:
  $f_w$=target frequency;
  $f_0$=shaft rotation frequency;
  $b_0$=zero wave slope; and
  $b_w$=phase shift slope.

15. The method of claim 13, further including the step of identifying a fold down subharmonic corresponding to said target frequency.

16. The method of claim 15, wherein said step of identifying a fold down subharmonic comprises the steps of:
  identifying a subharmonic frequency width based on a rotational speed of said rotor and said predetermined number of rotor revolutions;
  identifying a target subharmonic by dividing said target frequency by said subharmonic frequency width;
  identifying a set of possible true subharmonics; and
  selecting one of the possible true subharmonics closest to said target subharmonic as said fold down subharmonic.

17. The method of claim 16, wherein said step of identifying said target subharmonic further comprises rounding to the closest integer the result of said dividing said target frequency by said subharmonic frequency width.

18. The method of claim 16, wherein said step of generating said output comprising said non-synchronous blade vibration frequency includes the step of identifying an accurate frequency by multiplying said fold down subharmonic by said subharmonic frequency width.

* * * * *